US012384262B2

(12) United States Patent
Tache

(10) Patent No.: US 12,384,262 B2
(45) Date of Patent: Aug. 12, 2025

(54) WEATHER SHIELD FOR A VEHICLE CHARGE PORT

(71) Applicant: GM Global Technology Operations LLC, Detroit, MI (US)

(72) Inventor: Oscar Tache, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 18/150,906

(22) Filed: Jan. 6, 2023

(65) Prior Publication Data

US 2024/0227587 A1  Jul. 11, 2024

(51) Int. Cl.
*B60L 53/16* (2019.01)
*B60K 1/04* (2019.01)

(52) U.S. Cl.
CPC .............. *B60L 53/16* (2019.02); *B60K 1/04* (2013.01)

(58) Field of Classification Search
CPC ........................................ B60L 53/16
See application file for complete search history.

(56) References Cited

U.S. PATENT DOCUMENTS

| 7,794,280 B1 * | 9/2010 | Markyvech | B60L 50/16 320/120 |
| 8,720,968 B2 * | 5/2014 | Zalan | B60L 53/16 296/97.22 |
| 9,327,594 B2 * | 5/2016 | Georgi | E05B 77/54 |
| 9,597,968 B2 * | 3/2017 | Schoener | H01R 13/5219 |
| 10,717,383 B2 * | 7/2020 | Ueno | B60Q 1/323 |
| 10,899,243 B2 * | 1/2021 | Kang | E05D 3/02 |
| 11,230,203 B2 * | 1/2022 | Ghannam | B60L 53/66 |
| 11,466,496 B2 * | 10/2022 | Shin | E05D 15/165 |
| 11,486,172 B2 * | 11/2022 | Bai | B60L 53/16 |
| 11,548,379 B2 * | 1/2023 | Salter | B60K 15/05 |
| 11,634,025 B2 * | 4/2023 | Rudolf | E05D 3/145 49/339 |
| 11,904,767 B2 * | 2/2024 | Kim | E05D 11/0081 |

(Continued)

FOREIGN PATENT DOCUMENTS

| CN | 112590946 A | 4/2021 |
| CN | 216545765 U | 5/2022 |
| DE | 102014111273 A1 | 2/2015 |

OTHER PUBLICATIONS

BestEVmod. "A charging port protector in the case of charging outside in a rain or snow day." Rivian Forums. https://www.https://www.rivianforums.com/forum/threads/a-charging-port-protector-in-the-case-of-charging-outside-in-a-rain-or-snow-day. 15905/ Jun. 2023. 2 pages.

(Continued)

Primary Examiner — Erez Gurari
(74) Attorney, Agent, or Firm — CANTOR COLBURN LLP

(57) ABSTRACT

A vehicle charge system includes a charge port having a charge port receptacle configured to transfer electrical energy from an electrical source to a vehicle battery. A door is pivotally mounted relative to the charge port receptacle. The door has an outer surface and an inner surface. A charge port shield includes a first surface and a second surface. The charge port shield is selectively supportable in the charge port and configured to provide a weather shield to the charge port receptacle.

20 Claims, 5 Drawing Sheets

(56) References Cited

U.S. PATENT DOCUMENTS

| | | | |
|---|---|---|---|
| 2013/0326955 A1* | 12/2013 | Kotama | E05F 15/40 49/13 |
| 2015/0042275 A1 | 2/2015 | Schoener et al. | |
| 2017/0197515 A1* | 7/2017 | Southey | B60K 15/05 |
| 2017/0368928 A1* | 12/2017 | Mori | B60K 15/05 |
| 2020/0055389 A1* | 2/2020 | Herzig | E05D 3/125 |
| 2022/0332199 A1* | 10/2022 | Cho | H01R 13/447 |
| 2023/0177896 A1* | 6/2023 | Lv | B60K 15/05 701/22 |
| 2023/0243203 A1* | 8/2023 | Sun | B60Q 9/00 49/13 |
| 2024/0149716 A1* | 5/2024 | Ive | B60L 53/16 |
| 2024/0227587 A1* | 7/2024 | Tache | B60L 53/16 |
| 2024/0253509 A1* | 8/2024 | Diamond | B60L 53/66 |
| 2024/0337144 A1* | 10/2024 | Och | B60L 53/16 |
| 2024/0409164 A1* | 12/2024 | Nemer | B60L 53/16 |
| 2025/0026414 A1* | 1/2025 | Michie | B60L 53/16 |
| 2025/0058659 A1* | 2/2025 | Sun | B60L 53/16 |

OTHER PUBLICATIONS

Favomoto. "Favomoto EV Charger Plug Port Cover Rainproof Waterproof Outdoor Electric Car Charging Port Cover Rain Sun UV Snow Protection for Electric Vehicles Yellow." Amazon. https://www.amazon.com/dp/B09WMS4N5z?ref=emc_s_m_5_i_atc. Mar. 2022. 3 pages.

Ford Motor Company. "F-150 Charge Port Weather Kit for Bev Lightning Only." Ford Accessories. https://accessories.ford.ca/shop/en/ca/f-150-charge-port-weather-kit-for-bev-lightning-only-pl3z-10d802-a (2022). 4 pages.

German Application No. 10 2023 127 505.4 filed Oct. 9, 2023; German Office Action dated Dec. 9, 2024; 8 pages.

* cited by examiner

WEATHER SHIELD FOR A VEHICLE CHARGE PORT

INTRODUCTION

The subject disclosure relates to electric vehicles and, more particularly, to a charge port weather shield for an electric vehicle.

Electric vehicles include a charge port that is typically covered by a door. The door protects a charge receptacle from weather, dirt, and debris during driving and when parked outdoors. When charging, the door is opened and a charging device is connected to the charge receptacle. When the door is open, and the vehicle is charging out of doors, the charge receptacle may be exposed to weather. Rain, snow, and dirt accumulating between the charging device and the charge receptacle could affect charging efficiency. Accordingly, it is desirable to provide a device that shields vehicle charging components from the weather.

SUMMARY

A vehicle charge system in accordance with a non-limiting example, includes a charge port having a charge port receptacle configured to transfer electrical energy from an electrical source to a vehicle battery. A door is pivotally mounted relative to the charge port receptacle. The door has an outer surface and an inner surface. A charge port shield includes a first surface and a second surface. The charge port shield is selectively supportable in the charge port and configured to provide a weather shield to the charge port receptacle.

In addition to one or more of the features described herein the inner surface of the door includes a plurality of support elements and the first surface of the charge port shield includes a plurality of support members that interact with the plurality of support elements to selectively support the charge port shield on the inner surface of the door.

In addition to one or more of the features described herein the plurality of support elements comprise hook receivers and the plurality of support members comprise hooks that selectively interact with the hook receivers to support the charge port shield on the inner surface of the door.

In addition to one or more of the features described herein the hook receivers comprise openings formed in the inner surface of the door.

In addition to one or more of the features described herein the plurality of support elements comprise magnets mounted to the inner surface of the door.

In addition to one or more of the features described herein the plurality of support members comprise magnetic elements configured to be attracted to the magnets.

In addition to one or more of the features described herein the magnetic elements comprise ferro-magnetic members.

In addition to one or more of the features described herein the charge port shield includes an opening that is selectively receptive of the charge port receptacle.

In addition to one or more of the features described herein the charge port shield includes a tab element that projects into the opening.

In addition to one or more of the features described herein the charge port shield is formed from a flexible weather resistant material.

In accordance with another non-limiting example, a vehicle includes a body, an electric motor supported in the body, a rechargeable energy storage system (RESS) supported in the body, and a charge port including a charge port receptacle mounted to the body. The charge port being electrically connected to the RESS. A door is pivotally mounted to the body relative to the charge port receptacle. The door has an outer surface and an inner surface. A charge port shield includes a first surface and a second surface. The charge port shield is selectively supportable in the charge port and configured to provide a weather shield to the charge port receptacle.

In addition to one or more of the features described herein the inner surface of the door includes a plurality of support elements and the first surface of the charge port shield includes a plurality of support members that interact with the plurality of support elements to selectively support the charge port shield on the inner surface of the door.

In addition to one or more of the features described herein the plurality of support elements comprise hook receivers and the plurality of support members comprise hooks that selectively interact with the hook receivers to support the charge port shield on the inner surface of the door.

In addition to one or more of the features described herein the hook receivers comprise openings formed in the inner surface of the door.

In addition to one or more of the features described herein the plurality of support elements comprise magnets mounted to the inner surface of the door.

In addition to one or more of the features described herein the plurality of support members comprise magnetic elements configured to be attracted to the magnets.

In addition to one or more of the features described herein the magnetic elements comprise ferro-magnetic members.

In addition to one or more of the features described herein the charge port shield includes an opening that is selectively receptive of the charge port receptacle.

In addition to one or more of the features described herein the charge port shield includes a tab element that projects into the opening.

In addition to one or more of the features described herein the charge port shield is formed from a flexible weather resistant material.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
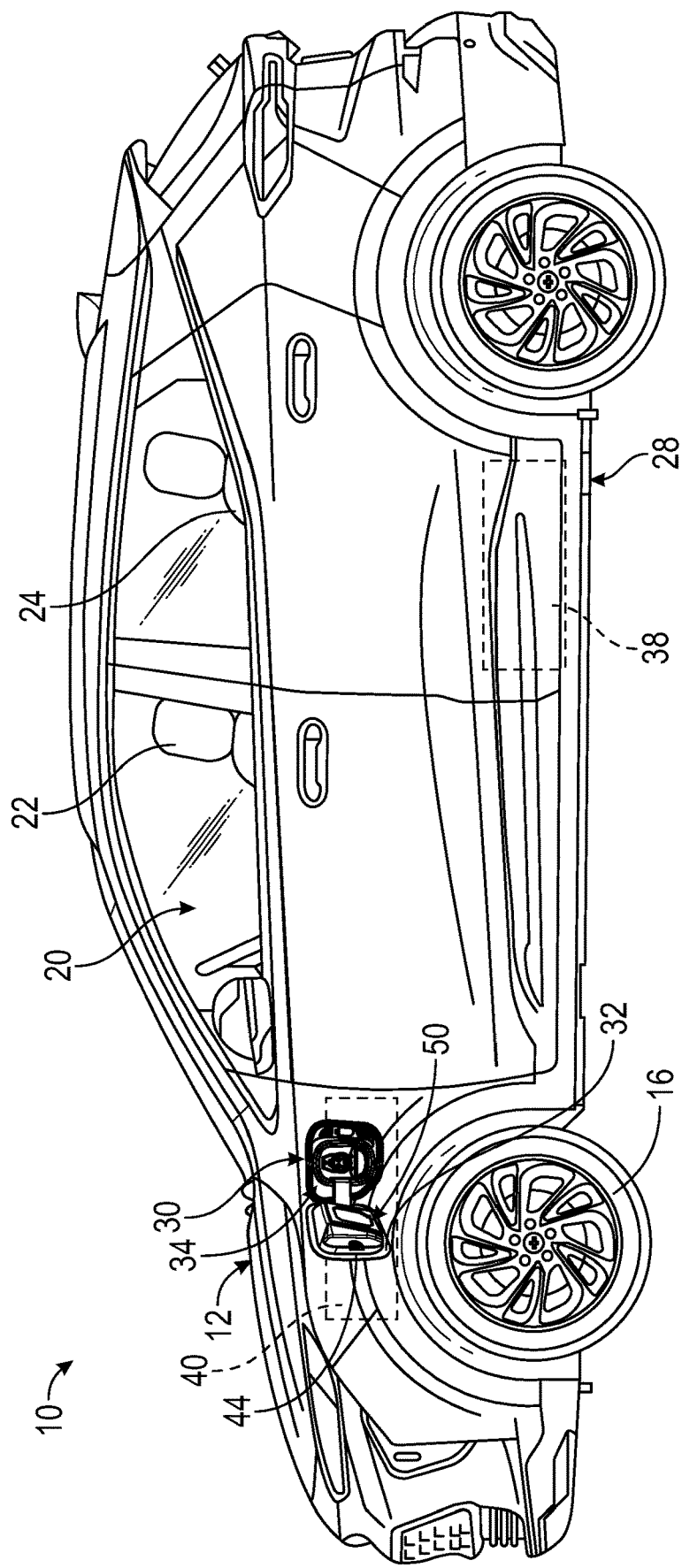
FIG. 1 is a left side view of a vehicle including a charge port weather shield, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a frame (not shown) and a plurality of wheels, one of which is indicated at 16. Body 12 includes a passenger compartment 20 that includes a driver's seat 22 and at least one rear passenger seat 24. Vehicle 10 takes the form of an electric vehicle (EV) 28 including a charge port 30 having a door 32 that is selectively pivotally mounted to body 12. Charge port 30 includes a charge port receptacle 34 that serves as an interface between an external charging device 36 (FIG. 7) and a rechargeable energy storage system (RESS) 38 supported in body 12. External charging device 36 forms part of a charging station (not shown) that provides electric energy stored in RESS 38. RESS 38 is operatively connected to an electric motor 40 that provides motive power to vehicle 10.

Figure 2:
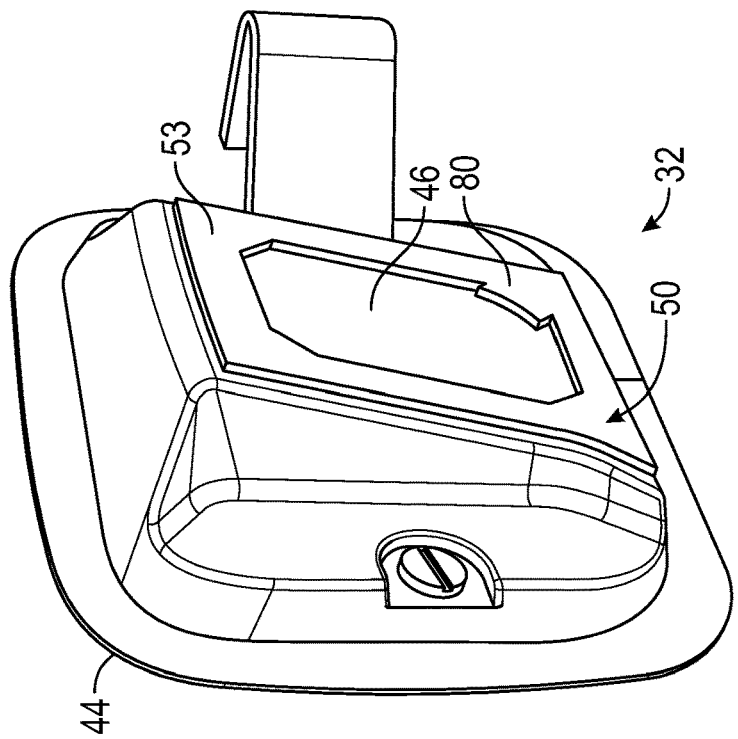
FIG. 2 is a perspective view of a charge port door of FIG. 1 supporting the charge port weather shield, in accordance with a non-limiting example.

Referring to FIG. 2 and with continued reference to FIG. 1, door 32 includes an outer surface 44 (FIG. 1) and an inner surface 46. In accordance with a non-limiting example, a charge port shield 50 is selectively supported on inner surface 46. As will become more fully evident herein, charge port shield 50 may be arranged about charge port receptacle 34 during a charging operation. Charge port shield 50 is formed from a flexible weather resistant material and includes a first surface 52 (FIG. 3) and a second surface 53. Charge port shield 50 protects charge port receptacle 34 from weather, dust, debris and the like when charging vehicle 10 outdoors in an area unprotected from weather.

Figure 3:
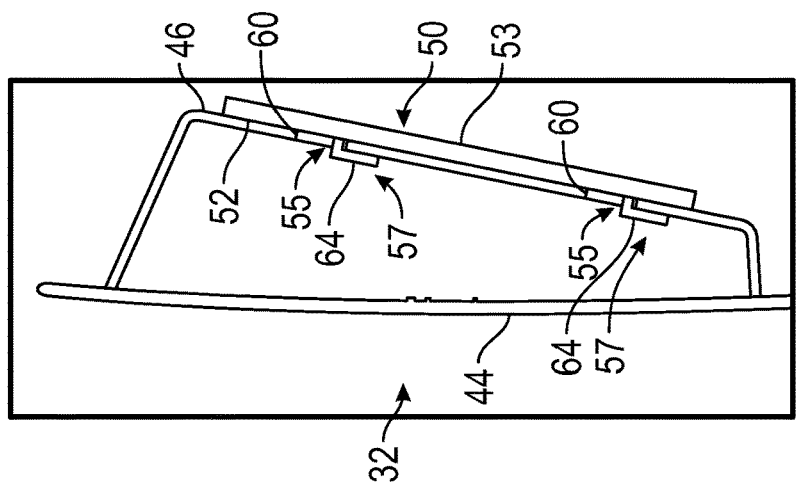
FIG. 3 is a cross-sectional side view of the charge port door of FIG. 2, in accordance with a non-limiting example.

In a non-limiting example illustrated in FIG. 3, inner surface 46 of door 32 includes a plurality of support elements 55 and charge port shield 50 includes a plurality of support members 57 arranged on first surface 52. Support elements 55 interact with support members 57 to selectively support charge port shield 50 on inner surface 46 when not in use. In this manner, charge port shield 50 is readily available when needed. In one non-limiting example, plurality of support members 57 take the form of hook receivers 60 which are shown as openings (not separately labeled) formed in inner surface 46. Plurality of support elements 55 take the form of hooks 64 that pass into hook receivers 60 to suspend charge port shield 50 on inner surface 46.

Figure 4:
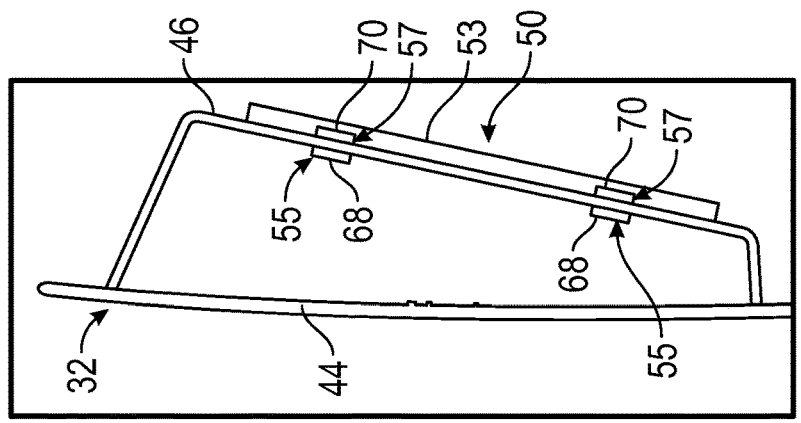
FIG. 4 is a cross-sectional side view of the charge port door of FIG. 2, in accordance with another non-limiting example.

In another non-limiting example, the plurality of support elements 55 arranged on inner surface 46 take the form of magnets 68 as shown in FIG. 4. The plurality of support members 57 take the form of magnetic elements 70 that are attracted to magnets 68. (or inner surface 46 of charge port door 32). That is, while inner surface 46 is shown to include magnets, if door 32 is formed from a ferro-magnetic material, additional magnets may not be employed. In a non-limiting example, magnetic elements 70 may take the form of a ferro-magnetic members (not separately labeled) including metals, such as iron, cobalt, and/or compositions thereof having a magnetic property. In the non-limiting example shown, magnet elements 70 are attracted to and connect with magnets 68 to support charge port shield 50 on inner surface 46 when not in use.

Figure 5:
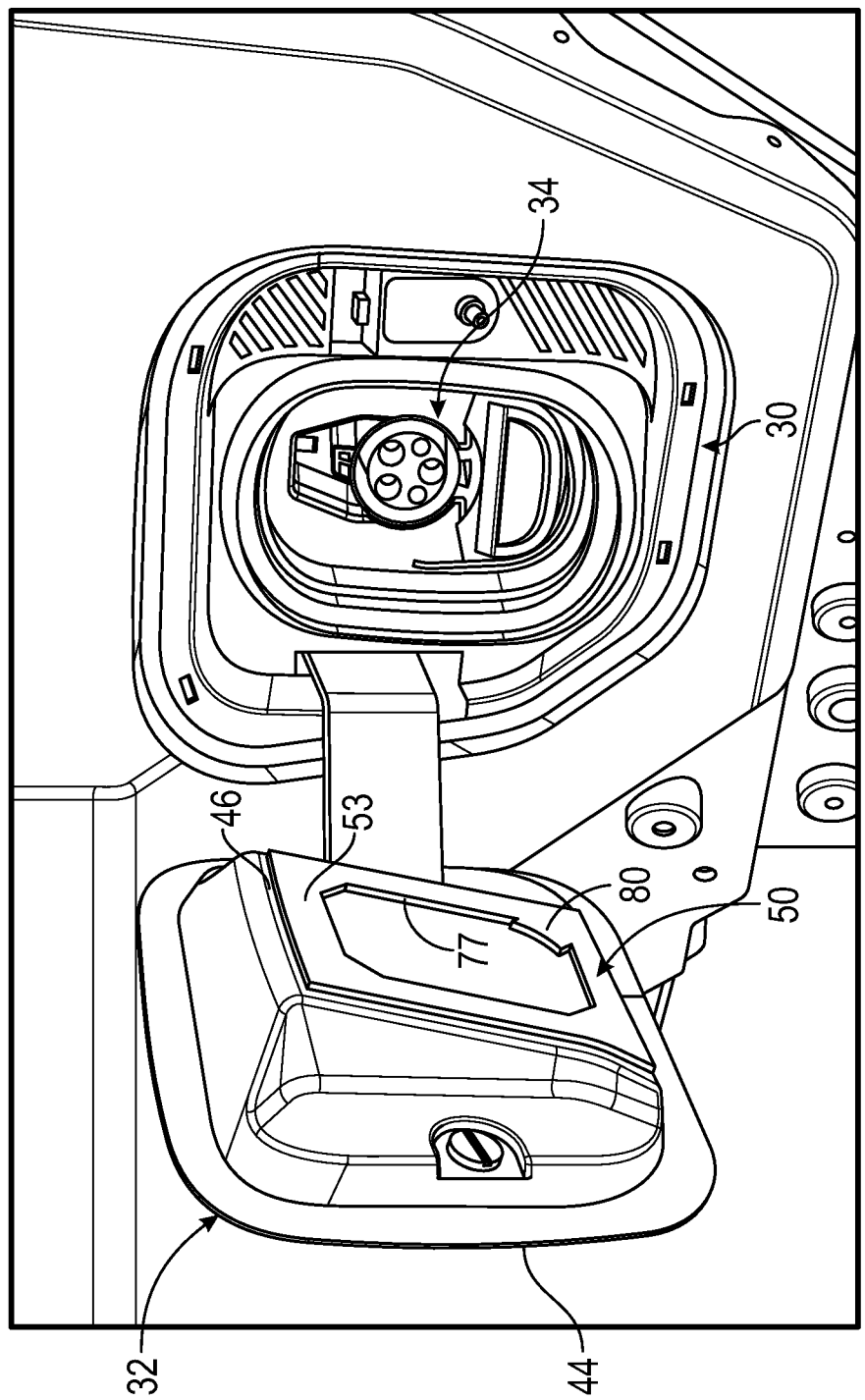
FIG. 5 is a perspective view of a vehicle charge port with the charge port weather shield on a charge port door in an open configuration, in accordance with a non-limiting example.
Figure 6:
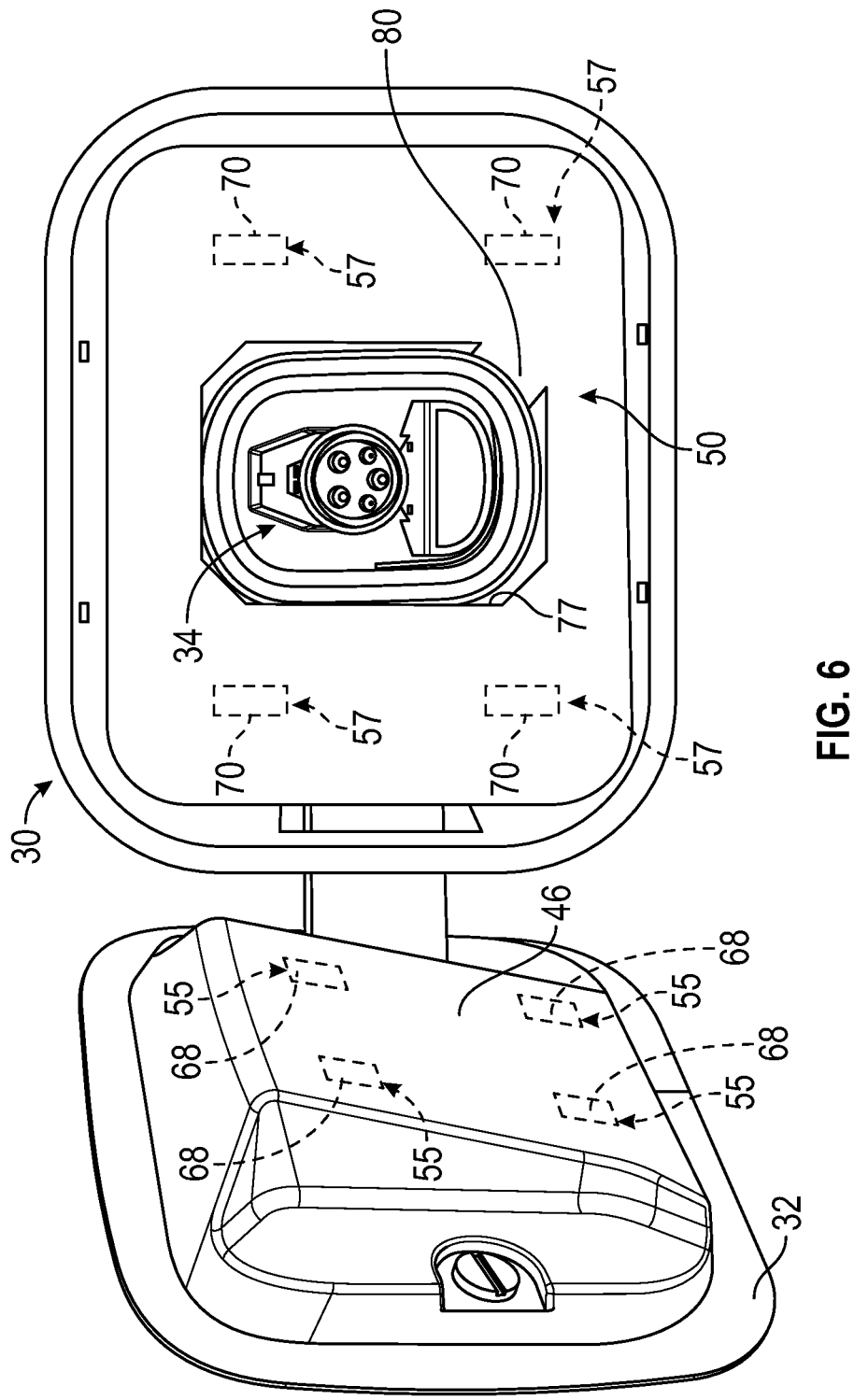
FIG. 6 is a perspective view of the vehicle charge port of FIG. 5 showing the charge port weather shield positioned about a charge port receptacle, in accordance with a non-limiting example.
Figure 7:
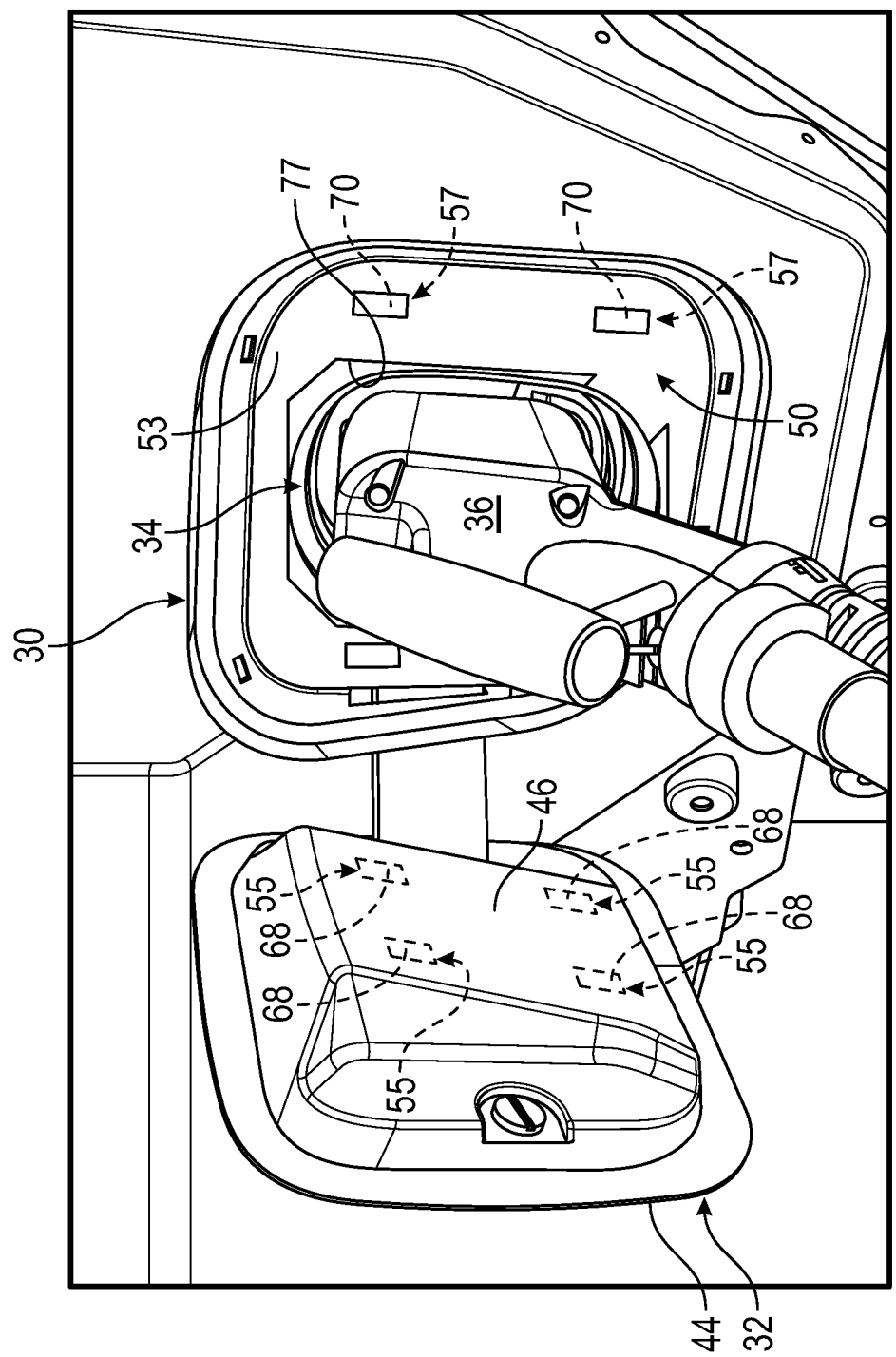
FIG. 7 is a perspective view of a charging device connected to the charge port of FIG. 6 with the charge port shield protecting the charge port receptacle, in accordance with a non-limiting example.

As shown in FIG. 5, charge port shield 50 includes an opening 77 that has a shape which corresponds to charge port receptacle 34. In a non-limiting example, charge port shield 50 is selectively supportable in charge port 30 with opening 77 being receptive of charge port receptacle 34. Charge port shield 50 may also include a tab element 80 that extends into opening 77. With this arrangement, when charge port shield 50 is mounted in charge port 30, tab element 80 engages with charge port receptacle 34 as shown in FIG. 6. In this manner, charge port shield 50 is held in place until a charging device is connected to charge port receptacle 34 to deliver electrical energy from an electrical source to RESS 38 as shown in FIG. 7.

At this point, it should be appreciated that the charge port shield may be deployed during outdoor charging cycles when the vehicle is exposed to weather. The charge port shield will reduce rain and snow infiltration to the charge port receptacle that may have a negative impact on charging efficiency. Charge port shield may be stored on the charge door 32 for ready access when needed or may be stored in the passenger compartment. The charge port shield is designed to be retained to the charging receptable while accommodating a wide array of charging device shapes.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle charge system comprising:
a charge port including a charge port receptacle configured to transfer electrical energy from an electrical source to a vehicle battery;
a door pivotally mounted relative to the charge port receptacle, the door having an outer surface and an inner surface; and
a charge port shield including a first surface and a second surface,
wherein the charge port shield is selectively supportable in the charge port and moveable between a first configuration in which the charge port shield is attached to the inner surface of the door and a second configuration in which the charge port shield is detached from the door and attached to the charge port to provide a weather shield to the charge port receptacle.

2. The vehicle charge system according to claim 1, wherein the inner surface of the door includes a plurality of support elements and the first surface of the charge port shield includes a plurality of support members that interact with the plurality of support elements to selectively support the charge port shield on the inner surface of the door.

3. The vehicle charge system according to claim 2, wherein the plurality of support elements comprise hook receivers and the plurality of support members comprise hooks that selectively interact with the hook receivers to support the charge port shield on the inner surface of the door.

4. The vehicle charge system according to claim 3, wherein the hook receivers comprise openings formed in the inner surface of the door.

5. The vehicle charge system according to claim 2, wherein the plurality of support elements comprise magnets mounted to the inner surface of the door.

6. The vehicle charge system according to claim 5, wherein the plurality of support members comprise magnetic elements configured to be attracted to the magnets.

7. The vehicle charge system according to claim 6, wherein the magnetic elements comprise ferro-magnetic members.

8. The vehicle charge system according to claim 1, wherein the charge port shield includes an opening that is selectively receptive of the charge port receptacle.

9. A vehicle charge system comprising:
a charge port including a charge port receptacle configured to transfer electrical energy from an electrical source to a vehicle battery;
a door pivotally mounted relative to the charge port receptacle, the door having an outer surface and an inner surface; and
a charge port shield including a first surface and a second surface, the charge port shield being selectively supportable in the charge port and configured to provide a weather shield to the charge port receptacle,
wherein the charge port shield includes an opening that is selectively receptive of the charge port receptacle, and wherein the charge port shield includes a tab element that projects into the opening.

10. The vehicle charge system according to claim 1, wherein the charge port shield is formed from a flexible weather resistant material.

11. A vehicle comprising:
a body;
an electric motor supported in the body;
a rechargeable energy storage system (RESS) supported in the body;
a charge port including a charge port receptacle mounted to the body, the charge port being electrically connected to the RESS;
a door pivotally mounted to the body relative to the charge port receptacle, the door having an outer surface and an inner surface; and
a charge port shield including a first surface and a second surface,
wherein the charge port shield is selectively supportable in the charge port and moveable between a first configuration in which the charge port shield is attached to the inner surface of the door and a second configuration in which the charge port shield is detached from the door and attached to the charge port to provide a weather shield to the charge port receptacle.

12. The vehicle according to claim 11, wherein the inner surface of the door includes a plurality of support elements and the first surface of the charge port shield includes a plurality of support members that interact with the plurality of support elements to selectively support the charge port shield on the inner surface of the door.

13. The vehicle according to claim 12, wherein the plurality of support elements comprise hook receivers and the plurality of support members comprise hooks that selectively interact with the hook receivers to support the charge port shield on the inner surface of the door.

14. The vehicle according to claim 13, wherein the hook receivers comprise openings formed in the inner surface of the door.

15. The vehicle according to claim 12, wherein the plurality of support elements comprise magnets mounted to the inner surface of the door.

16. The vehicle according to claim 15, wherein the plurality of support members comprise magnetic elements configured to be attracted to the magnets.

17. The vehicle according to claim 16, wherein the magnetic elements comprise ferro-magnetic members.

18. The vehicle according to claim 11, wherein the charge port shield includes an opening that is selectively receptive of the charge port receptacle.

19. The vehicle according to claim 18, wherein the charge port shield includes a tab element that projects into the opening.

20. The vehicle according to claim 11, wherein the charge port shield is formed from a flexible weather resistant material.

* * * * *